United States Patent
Yu et al.

(10) Patent No.: US 9,578,277 B2
(45) Date of Patent: Feb. 21, 2017

(54) METHOD AND DEVICE FOR STORING VIDEO IMAGES

(71) Applicant: HANGZHOU HIKVISION DIGITAL TECHNOLOGY CO., LTD., Hangzhou (CN)

(72) Inventors: Hai Yu, Hangzhou (CN); Tian Huang, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 14/763,176

(22) PCT Filed: Aug. 29, 2014

(86) PCT No.: PCT/CN2014/085495
§ 371 (c)(1),
(2) Date: Jul. 24, 2015

(87) PCT Pub. No.: WO2015/043356
PCT Pub. Date: Apr. 2, 2015

(65) Prior Publication Data
US 2015/0365623 A1     Dec. 17, 2015

(30) Foreign Application Priority Data

Sep. 26, 2013  (CN) .......................... 2013 1 0447051

(51) Int. Cl.
*H04N 5/91*    (2006.01)
*H04N 9/804*   (2006.01)
(Continued)

(52) U.S. Cl.
CPC ............ *H04N 5/91* (2013.01); *G06K 9/00771* (2013.01); *H04N 9/8042* (2013.01);
(Continued)

(58) Field of Classification Search
None
See application file for complete search history.

(56) References Cited

U.S. PATENT DOCUMENTS

| 6,591,014 B1 | 7/2003 | Ueda |
| 2003/0012560 A1 | 1/2003 | Mori et al. |

(Continued)

FOREIGN PATENT DOCUMENTS

| CN | 1750647 A | 3/2006 |
| CN | 101998111 A | 3/2011 |

(Continued)

OTHER PUBLICATIONS

Search Report in International Application No. PCT/CN2014/085495 dated Nov. 19, 2014.
(Continued)

*Primary Examiner* — Eileen Adams
(74) *Attorney, Agent, or Firm* — Marshall, Gerstein & Borun LLP

(57) ABSTRACT

The present disclosure provides a method and device for storing a video image. The method includes the follows. For each frame of image collected, a confidence value is generated after passing M frames of image each time, in which M is a positive integer. A target encoding frame rate may be determined based on the confidence value latest generated, after passing N frames of image each time. The N frames of image may be encoded and recorded, based on the target encoding frame rate determined, in which N is a positive integer. By adopting the technical solutions of the present disclosure, adaptive capability and availability of system may be improved.

10 Claims, 2 Drawing Sheets for each frame of image collected, generate a confidence value after passing M frames of image each time, in which M is a positive integer — 11 after passing N frames of image each time, determine a target encoding frame rate based on the confidence value latest generated, encode and record the N frames of image based on the determined target encoding frame rate, in which N is a positive integer — 12

(51) Int. Cl.
*H04N 19/146* (2014.01)
*H04N 19/172* (2014.01)
*G06K 9/00* (2006.01)
*H04N 19/132* (2014.01)
*H04N 19/136* (2014.01)
*H04N 19/177* (2014.01)

(52) U.S. Cl.
CPC ......... *H04N 19/132* (2014.11); *H04N 19/136* (2014.11); *H04N 19/146* (2014.11); *H04N 19/172* (2014.11); *H04N 19/177* (2014.11)

(56) References Cited

U.S. PATENT DOCUMENTS

| | | | |
|---|---|---|---|
| 2007/0116126 A1* | 5/2007 | Haskell | H04N 19/196 375/240.21 |
| 2007/0189728 A1 | 8/2007 | Yu | |
| 2007/0217765 A1 | 9/2007 | Itoh et al. | |
| 2008/0247462 A1* | 10/2008 | Demos | H04N 19/597 375/240.03 |
| 2009/0154895 A1* | 6/2009 | Taoka | H04N 5/772 386/239 |

FOREIGN PATENT DOCUMENTS

| | | |
|---|---|---|
| CN | 102572357 A | 7/2012 |
| CN | 102780869 A | 11/2012 |

OTHER PUBLICATIONS

Extended European Search Report in EP Application No. 14848931.3 dated Aug. 1, 2016, 9 pages.

\* cited by examiner

METHOD AND DEVICE FOR STORING VIDEO IMAGES

RELATED APPLICATION

The application claims the benefit of Chinese Patent Application No. 201310447051.4, filed with the State Intellectual Property Office of the P.R.C on Sep. 26, 2013 and entitled "method and device for storing video images", the entire disclosures of which are hereby incorporated by reference.

TECHNICAL FIELD

The present disclosure relates to video processing technologies, and more particularly, to a method and device for storing video images.

BACKGROUND

Accompanying with people's increasing attention to safety, more and more places have installed monitoring equipment (such as camera), meanwhile monitoring system gradually develops towards high definition (HD). Correspondingly, storage space occupied by monitoring video is greater, and costs on hard disk are higher.

However, in practical applications, what is captured by a monitoring device in most of the time throughout the day is invalid data, without occurrence of a focused-on target. Thus, there is an urgent problem to be solved about how to effectively reduce such invalid data, so as to save storage space and costs.

Regarding the foregoing problem, the following processing modes are generally adopted in the prior art. The motion detecting or intelligent analysis technologies may be employed, to analyze whether a focused-on target exists in a video, and output a determination result about "yes" or "no". When the determination result is "yes", encode and record the video; otherwise, encoding and recording are not executed.

However, some problems may occur when applying the foregoing modes in practical applications, for example, no matter employing the motion detecting or intelligent analysis technologies, as long as "yes" or "no" is used in the judgment, the probability of misjudgment and missing judgment may exist under technical conditions. When the misjudgment occurs, additional storage space may be consumed. When the missing judgment occurs, key data may be lost. Subsequently, adaptive capability and availability of system may be lowered.

SUMMARY

In view of above, the present disclosure provides a method and device for storing video image, so as to improve adaptive capability and availability of a system.

To achieve the foregoing objectives, the technical solutions of the present disclosure are implemented as follows.

A method for storing a video image, including:

or each frame of image collected, generating a confidence value after passing M frames of image each time, wherein M is a positive integer;

after passing N frames of image each time, determining a target encoding frame rate based on the confidence value latest generated, encoding and recording the N frames of image based on the target encoding frame rate determined, wherein N is a positive integer.

A device for storing a video image, including a memory, and a processor in communication with the memory, wherein the memory stores instructions executable by the processor, and the instructions are stored in a first processing module and a second processing module, wherein for each frame of image collected, the first processing module is to generate a confidence value after passing M frames of image each time, and transmitting the confidence value to the second processing module, wherein M is a positive integer; and after passing N frames of image each time, the second processing module is to determine a target encoding frame rate based on the confidence value latest generated, encoding and recording the N frames of image based on the determined target encoding frame rate, wherein N is a positive integer.

Thus, it can be seen that by adopting the technical solutions of the present disclosure, the target encoding frame rate may be continuously adjusted based on confidence value. And then, encoding and recording may be executed, based on the adjusted target encoding frame rate, so as to avoid influence brought by misjudgment and missing judgment in the prior art to the largest extent, and improve adaptive capability and availability of system.

BRIEF DESCRIPTIONS OF THE DRAWINGS

DETAILED DESCRIPTIONS

Regarding the problems in the prior art, the present disclosure provides a technical solution for storing a video image.

To make the technical solutions of the present disclosure more clear, detailed descriptions about the technical solutions in the present disclosure are further provided in the following, accompanying with attached figures and examples.

Figure 1:
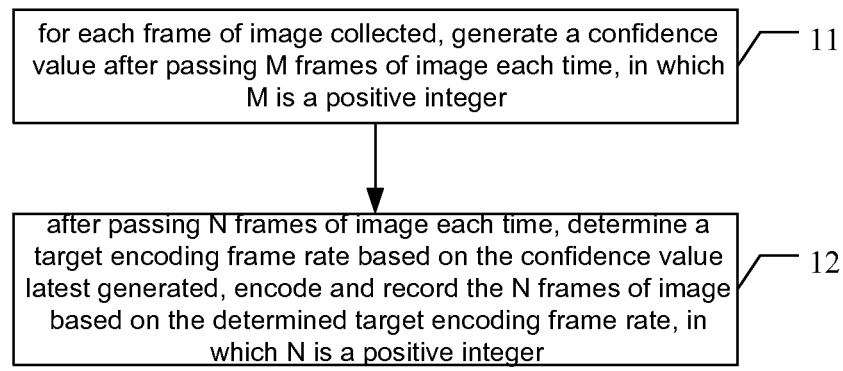
FIG. 1 is a flowchart illustrating a method for storing a video image, in accordance with an example of the present disclosure.

FIG. 1 is a flowchart illustrating a method for storing a video image, in accordance with an example of the present disclosure. As shown in FIG. 1, the method may include the following blocks 11-12.

In block 11, for each frame of image collected, generate a confidence value after passing M frames of image each time, in which M is a positive integer.

The confidence value is a rational number located in $[T_{min}, T_{max}]$. Generally, $T_{min}$ is greater than or equal to 0. Greater confidence value denotes greater probability for a focused-on target exists in an image.

For example, when the value of $T_{min}$ is 0, it denotes that a focused-on target does not exist in an image. When the value of $T_{max}$ is 100, it denotes that a focused-on target exists in an image. Different values in 0~100 denote different possibilities for a focused-on target exists in an image.

In practical applications, a confidence value may be generated for each frame of image, that is, a confidence value may be generated after passing every frame of image.

Alternatively, a confidence value may also be generated after passing multiple frames of image each time. For example, when original image frame rate is 25 frames per second, a confidence value may be generated after passing 25 frames of image each time.

The confidence value may be generated by adopting motion detecting or intelligent analysis technologies.

The motion detecting technologies are generally applied to a fixed scene, and may obtain relevant information, such as area moved in a picture, moving range, and so on, by analyzing two adjacent frames of image, or analyzing multiple frames of image.

The intelligent analysis technologies may analyze suspicious event behavior in a picture, and so on, by performing a background modeling, a target segmentation, a trajectory tracking to a scene image.

In block 12, after passing N frames of image each time, determine a target encoding frame rate based on a confidence value latest generated, encode and record the N frames of image based on the target encoding frame rate determined, in which N is a positive integer.

Specific implementation modes of block 12 may be different, based on different values of N, which will be respectively described in the following. In addition, values of N and M may be the same, or may be different.

When N=1, for each frame of image, respectively determine whether it is necessary to encode the frame of image. When determining that it is necessary to encode the frame of image, encode and record the frame of image.

Specifically speaking, the following processes may be respectively performed to each frame of image.

1) Determine the target encoding frame rate corresponding to the confidence value latest generated, based on a mapping relationship curve between confidence value and target encoding frame rate.

The mapping relationship curve is a monotonic non-declined curve.

The target encoding frame rate is a rational number located in [$F_{min}$, $F_{max}$], in which $F_{min}>0$.

When the confidence value is $T_{min}$, the corresponding target encoding frame rate is $F_{min}$. When the confidence value is $T_{max}$, the corresponding target encoding frame rate is $F_{max}$.

2) Map the determined target encoding frame rate to an extraction factor X, in which X is a positive integer.

For example, the original image frame rate is 25 frames per second, the target encoding frame rate is 7 frames per second, and then an encoding frame ratio is 7/25, which is between 1/3 and 1/4. Subsequently, 7 frames of image may be relatively evenly extracted from the 25 frames of image, so as to be encoded and recorded. Correspondingly, 3 and 4 may be taken as the extraction factor.

3) Determine frame number K of image un-encoded between the latest encoding and the frame of image, and determine whether K+1>=X. When determining that K+1>=X, encode and record the frame of image; otherwise, encoding and recording are not performed to the frame of image.

That is, for the frame of image, when K+1>=X, encode and record the frame of image, and reset K. When K+1<X, encoding and recording are not performed to the frame of image, and add 1 to the value of K, that is, K++.

When N>1, the following processes may be respectively performed to every N frames of image.

1) Determine the target encoding frame rate corresponding to the confidence value latest generated, based on the mapping relationship curve between confidence value and target encoding frame rate.

2) Encode and record the N frames of image, based on the determined target encoding frame rate.

For example, the original image frame rate is 25 frames per second, N=25, the target encoding frame rate is 12.5 frames per second, and then, encode and record each frame of image extracted, based on a mode for extracting a frame every other frame.

When N=1, the foregoing processing mode may be referred to as a first processing mode. When N>1, the processing mode may be referred to as a second processing mode. Essentially, when determining whether K+1>=X for each frame of image by using the second processing mode, the first processing mode may be achieved.

In addition, the technical solutions of the present disclosure also put forward the following. Determine actual bit stream R and expected bit stream S, every time a predetermined condition is met. Determine whether it is necessary to adjust the mapping relationship curve based on R and S. When determining that it is necessary to adjust the mapping relationship curve based on R and S, adjust the mapping relationship curve.

The abovementioned adjusting may include as follows. When S>R, increase the target encoding frame rate corresponding to the confidence value between $T_{min}$ and $T_{max}$. When S<R, decrease the target encoding frame rate corresponding to the confidence value between $T_{min}$ and $T_{max}$.

In practical applications, a value obtained after dividing consumed storage capacity by storage time may be calculated, and a calculation result may be taken as R. For example, the consumed storage capacity in storage space is xGB, in which videos of y days are stored, and then the value of x/y may be taken as R. R may reflect actual consumption rate of storage statistically.

A result obtained after dividing un-consumed storage capacity by expected storage time may also be calculated, and the calculation result may be taken as S. For example, the remaining (e.g., not-consumed) storage capacity in storage space is aGB, expected storage time is b days, and then, the value of a/b may be taken as S. S may reflect consumption rate of storage expecting to be achieved. The expected storage time may be set manually, and specific value of the expected storage time may be determined based on actual requirements.

The unit of foregoing storage time is day, which may be also hour, second, and so on. In addition, other modes occurred to persons having ordinary skill in the art may also be used to determined R and S, which are not limited to the foregoing modes.

Every time a predetermined condition is met, e.g., after scheduled time, or extra 10% of storage capacity is consumed each time, values of R and S may be determined once again. Alternatively, expect for the first time, R may be determined subsequently, and S may be calculated by using R. Correspondingly, every time after determining R and S, whether it is necessary to adjust the mapping relationship curve may be further determined. When determining that it is necessary to adjust the mapping relationship curve, adjust the mapping relationship curve; otherwise, not adjust the mapping relationship curve.

Figure 2:
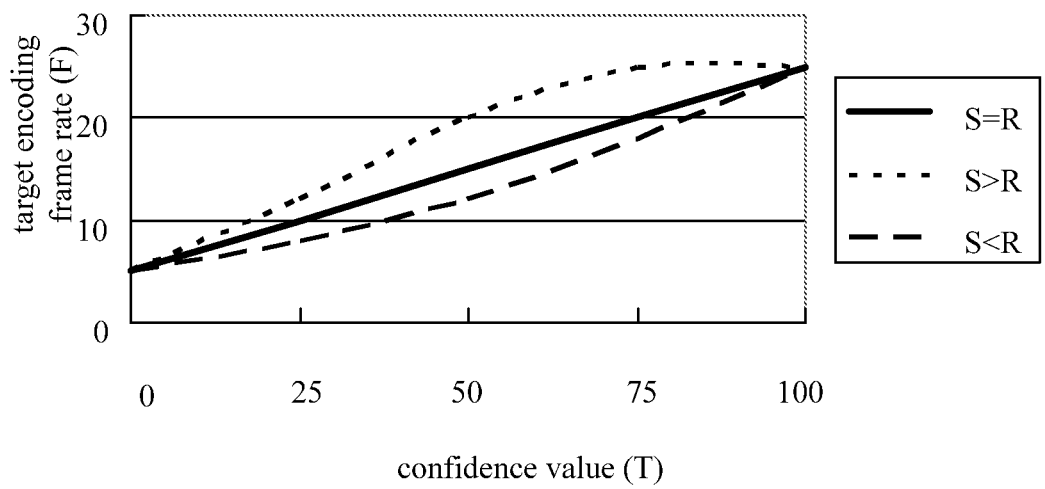
FIG. 2 is a schematic diagram illustrating a mapping relationship between confidence value and target encoding frame rate, in accordance with an example of the present disclosure.

FIG. 2 is a schematic diagram illustrating a mapping relationship between confidence value (T) and target encoding frame rate (F), in accordance with an example of the present disclosure. As shown in FIG. 2, suppose the original image frame rate is 25 frames per second, and a user expects to encode and record with such frame rate, when a focused-on target exists. And then, 25 may be taken as $F_{max}$. Meanwhile, suppose a minimum frame rate acceptable to a user is 5 frames per second, 5 may be taken as $F_{min}$. When S=R, the mapping relationship curve may be maintained without change. When S>R, it denotes that consumption of storage space is lower than expectation. To store more data, the mapping relationship curve may be moved towards upper right. That is, increase the target encoding frame rate corresponding to the confidence value between $T_{min}$ and $T_{max}$. On the contrary, when S<R, it denotes that consumption of storage space is greater than the expectation. To achieve the expected storage time, the mapping relationship curve may be moved towards lower left. That is, decrease the target encoding frame rate corresponding to the confidence value between $T_{min}$ and $T_{max}$.

In different conditions, such as S=R, S>R, S<R, specific values of the target encoding frame rate respectively corresponding to different confidence values may be determined based on actual requirements. FIG. 2 may denote a change trend.

In addition, in the technical solutions of the present disclosure, when encoding an image, various standard encoding modes may be employed, such as H.264/advanced video coding (AVC), Moving Picture Experts Group 4 (MPEG4), High Efficiency Video Coding (HEVC). Alternatively, private compression algorithms may also be employed. The bit stream obtained after encoding may be stored into the storage space.

Figure 3:
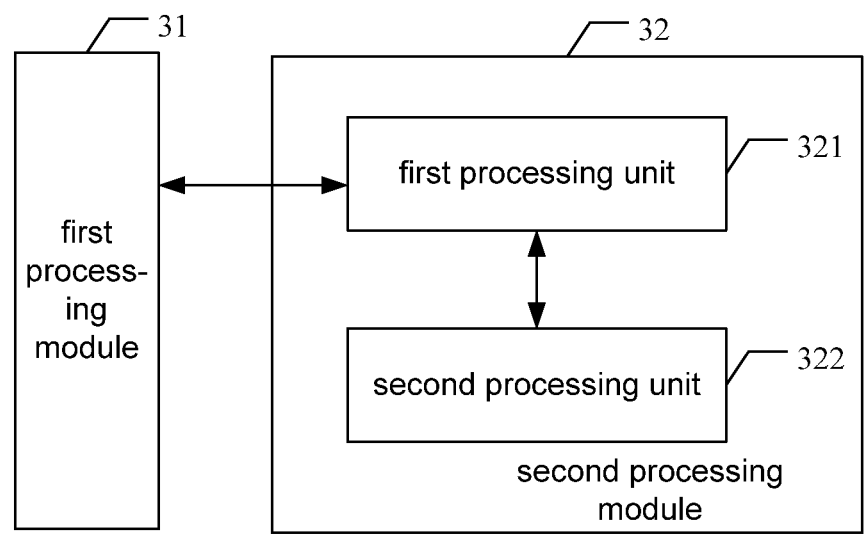
FIG. 3 is a schematic diagram illustrating structure of a device for storing a video image, in accordance with an example of the present disclosure.

Based on the foregoing descriptions, FIG. 3 is a schematic diagram illustrating structure of a device for storing a video image, in accordance with an example of the present disclosure. As shown in FIG. 3, the device may include a first processing module 31 and a second processing module 32.

For each frame of image collected, the first processing module 31 is to generate a confidence value after passing M frames of image each time, and transmit the confidence value to the second processing module 32. M is a positive integer.

After passing N frames of image each time, the second processing module 32 may determine a target encoding frame rate based on the confidence value latest generated, encode and record the N frames of image based on the target encoding frame rate determined. N is a positive integer.

Specifically, the second processing module 32 may include a first processing unit 321 and a second processing unit 322.

When N=1, the first processing unit 321 is to execute the following processes for each frame of image. Determine the target encoding frame rate corresponding to the confidence value latest generated, based on the mapping relationship curve between confidence value and target encoding frame rate. Map the determined target encoding frame rate to an extraction factor X, in which X is a positive integer. Determine frame number K of image un-encoded between latest encoding and the frame of image, and determine whether K+1>=X. When determining that K+1>=X, the first processing unit 321 may inform the second processing unit 322 to execute functions of the second processing unit 322. The second processing unit 322 is to encode and record the frame of image.

Alternatively, when N>1, for every N frames of image, the first processing unit 321 may respectively execute the following processes. Determine the target encoding frame rate corresponding to the confidence value latest generated, based on the mapping relationship curve between confidence value and target encoding frame rate. Transmit the determined target encoding frame rate to the second processing unit 322. The second processing unit 322 may encode and record the N frames of image, based on the target encoding frame rate determined.

Specifically, the mapping relationship curve is a monotonic non-declined curve.

The confidence value is a rational number located in $[T_{min}, T_{max}]$. A greater confidence value denotes a greater probability for a focused-on target exists in an image.

The target encoding frame rate is a rational number located in $[F_{min}, F_{max}]$. $F_{min}>0$.

When the confidence value is $T_{min}$, the corresponding target encoding frame rate is $F_{min}$. When the confidence value is $T_{max}$, the corresponding target encoding frame rate is $F_{max}$.

In addition, the second processing unit 322 is further to determine actual bit stream R and expected bit stream S, every time a predetermined condition is met, and transmit R and S to the first processing unit 321.

Correspondingly, the first processing unit 321 is further to determine whether it is necessary to adjust the mapping relationship curve, based on R and S. When determining it is necessary to adjust the mapping relationship curve based on R and S, adjust the mapping relationship curve. The adjusting may include as follows. When S>R, increase the target encoding frame rate corresponding to the confidence value between $T_{min}$ and $T_{max}$. When S<R, decrease the target encoding frame rate corresponding to the confidence value between $T_{min}$ and $T_{max}$.

R=consumed storage capacity/stored time. S=un-consumed storage capacity/expected storage time.

The specific work process of the device illustrated in FIG. 3 may refer to corresponding descriptions in the foregoing method examples, which are not repeated here.

In a word, by adopting the technical solutions of the present disclosure, the target encoding frame rate may be continuously adjusted based on the confidence value. Encoding and recording may be executed based on the adjusted target encoding frame rate, so as to avoid the influence brought by misjudgment and missing judgment in the prior art to the largest extent, and improve adaptive capability and availability of system. A self-adaptive adjustment may be employed by the mapping between confidence value and target encoding frame rate, so as to enable storable recording time in storage space to be controllable. In addition, by adopting the technical solutions of the present disclosure, for a scene where no focused-on target exists, a relatively lower frame rate may be used to encode and record. Thus, the effects of fast forward may be achieved by playback, so as to improve efficiency when querying for playback video.

Based on the descriptions of foregoing examples, persons having ordinary skill in the art may clearly learn that, the foregoing examples may be implemented with a necessary general-purpose hardware platform having the aid of software, or may be implemented with hardware. In many cases, the previous one is a better implementation mode. Based on such understanding, the technical solutions of the present disclosure may be demonstrated with a software product. The computer software product may be stored in a storage medium, which includes several instructions to enable a computer device (may be a personal computer (PC), server, or a network device, etc.), to execute the method of each foregoing example.

Persons having ordinary skill in the art may understand that the modules in the device of the foregoing examples may be distributed in the device of the examples, based on descriptions about the examples, or may be changed correspondingly to be located in one or more device, which is different from that in the foregoing examples. The modules in the foregoing example may be integrated into one module, or may be further divided into multiple sub-modules.

Based on the technical solutions provided by each abovementioned example, a machine readable storage medium is also put forward, which may store instructions enabling a machine to execute the mapping management method mentioned in the present disclosure. Specifically, a system or device equipped with such storage medium may be provided, and such storage medium may store software program codes, which may implement functions of any abovementioned example. A computer (central processing unit (CPU) or microprocessor unit (MPU)) of the system or device may be enabled to read and execute the program codes stored in the storage medium.

In such case, the program codes read from the storage medium may implement functions of any abovementioned example. Thus, the program codes and storage medium storing the program codes may constitute a part of the foregoing technical solution for storing video images.

The storage medium examples for providing program codes may include floppy disk, hard disk, magneto-optical disk (MOD), compact disk (CD)(such as CD-read-only memory (CD-ROM), CD-recordable (CD-R), CD-Rewriteable (CD-RW), digital video disc-ROM (DVD-ROM), DVD-random access memory (DVD-RAM), DVD-RW, DVD+RW), magnetic tape, non-volatile memory card and ROM. Alternatively, the program codes may also be downloaded from a server computer through a communication network.

In addition, it should be clear that, the operating system (OS) of a computer may be enabled to execute part of or all of the actual operations, by executing the program codes read by the computer, or based on instructions in the program codes, thereby implementing functions of any of abovementioned example.

In addition, it should be understood that, the program codes read from the storage medium may be written into a memory set within an expansion board inserted into a computer, or be written into a memory set within an extension unit connected with a computer. Subsequently, based on the instructions of the program codes, the CPU installed on the expansion board or extension unit may be enabled to execute part of or all of actual operations, so as to implement functions of any of abovementioned example.

For example, another structure of a device for storing a video image in an example of the present disclosure may include a memory, and a processor in communication with the memory. The memory may store computer executable instructions, which may be executed by the processor. The computer executable instructions may include a first processing module instruction and a second processing module instruction, which may respectively indicate to execute functions of the first processing module and the second processing module as shown in FIG. 3.

For example, still another structure of a device for storing a video image provided by the present disclosure may include a memory, and a processor in communication with the memory. The memory may store instructions executable by the processor, and the instructions are stored in a first processing module and a second processing module. When the foregoing instructions are executed, functions of the first processing module and the second processing module are respectively the same as that of the first processing module 31 and the second processing module 32 as shown in FIG. 3.

The foregoing is only preferred examples of the present disclosure, which is not for use in limiting the protection scope of the present disclosure. Any modifications, equivalent substitutions and improvements made within the spirit and principle of the present disclosure, should be covered by the protection scope of the present disclosure.

What is claimed is:

1. A method for storing a video image, comprising:
for each frame of image collected, generating a confidence value after passing M frames of image each time, wherein M is a positive integer;
after passing N frames of image each time, determining a target encoding frame rate based on the confidence value latest generated and a mapping relationship curve between the confidence value and the target encoding frame rate, encoding and recording the N frames of image based on the target encoding frame rate determined, wherein N is a positive integer;
wherein the mapping relationship curve is a monotonic non-declined curve, the confidence value is a rational number located in [Tmin, Tmax], Tmin>=0, a greater confidence value denotes a greater probability for a focused-on target exists in an image;
wherein the target encoding frame rate is a rational number located in [Fmin, Fmax], Fmin>0;
when the confidence value is Tmin, the corresponding target encoding frame rate is Fmin; and
when the confidence value is Tmax, the corresponding target encoding frame rate is Fmax.

2. The method according to claim 1, wherein when N=1, after passing N frames of image each time, determining the target encoding frame rate based on the confidence value latest generated, encoding and recording the N frames of image based on the target encoding frame rate determined, comprise:
respectively executing for each frame of image:
determining the target encoding frame rate corresponding to the confidence value latest generated, based on the mapping relationship curve between confidence value and target encoding frame rate;
mapping the determined target encoding frame rate to an extraction factor X, wherein X is a positive integer;
determining frame number K of image un-encoded between the latest encoding and the frame of image; and
determining whether K+1>=X;
when determining that K+1>=X, encoding and recording the frame of image.

3. The method according to claim 1, wherein when N>1, after passing N frames of image each time, determining the target encoding frame rate based on the confidence value latest generated, encoding and recording the N frames of image based on the target encoding frame rate determined, comprise:
respectively executing the following processes for every N frames of image:
determining the target encoding frame rate corresponding to the confidence value latest generated, based on the mapping relationship curve between confidence value and target encoding frame rate; and
encoding and recording the N frames of image based on the target encoding frame rate determined.

4. The method according to claim 1, further comprising:
determining an actual bit stream R and an expected bit stream S, every time when a predetermined condition is met,
determining whether it is necessary to adjust the mapping relationship curve based on the actual bit stream R and the expected bit stream S;
when determining that it is necessary to adjust the mapping relationship curve based on the actual bit stream R and the expected bit stream S, adjusting the mapping relationship curve;
wherein the adjusting comprises:
when the expected bit stream S is greater than the actual bit stream R, increasing the target encoding frame rate corresponding to the confidence value between Tmin and Tmax;
when the expected bit stream S is less than the actual bit stream R, decreasing the target encoding frame rate corresponding to the confidence value between Tmin and Tmax.

5. The method according to claim 4, wherein determining the actual bit stream R and the expected bit stream S comprises:
calculating a first result obtained after dividing consumed storage capacity by stored time, and taking the first result as the actual bit stream R; and
calculating a second result obtained after dividing un-consumed storage capacity by expected storage time, and taking the second result as the expected bit stream S.

6. A device for storing a video image, comprising a memory, and a processor in communication with the memory, wherein the memory stores instructions executable by the processor, and the instructions are stored in a first processing module and a second processing module, wherein
for each frame of image collected, the first processing module is to generate a confidence value after passing M frames of image each time, and transmitting the confidence value to the second processing module, wherein M is a positive integer; and
after passing N frames of image each time, the second processing module is to determine a target encoding frame rate based on the confidence value latest generated and a mapping relationship curve between the confidence value and the target encoding frame rate, encoding and recording the N frames of image based on the determined target encoding frame rate, wherein N is a positive integer;
wherein the mapping relationship curve is a monotonic non-declined curve, the confidence value is a rational number between [Tmin,Tmax], Tmin>=0, a greater confidence value denotes a greater probability for a focused-on target exists in an image, the target encoding frame rate is a rational number between [Fmin, Fmax], Fmin>0;
when the confidence value is Tmin, the corresponding target encoding frame rate is Fmin; and
when the confidence value is Tmax, the corresponding target encoding frame rate is Fmax.

7. The device according to claim 6, wherein the second processing module comprises a first processing unit and a second processing unit,
when N=1, the first processing unit is to perform the following processes to each frame of image:
determine the target encoding frame rate corresponding to the confidence value latest generated, based on the mapping relationship curve between confidence value and target encoding frame rate;
map the target encoding frame rate determined to an extraction factor X, wherein X is a positive integer;
determine frame number K of un-encoded image between the latest encoding and the frame of image, and determine whether K+1>=X;
when determining that K+1>=X, inform the second processing unit to execute functions of the second processing unit; and
the second processing unit is to encode and record the frame of image.

8. The device according to claim 6, wherein the second processing module comprises a first processing unit and a second processing unit,
when N>1, the first processing unit is to perform the following processes to every N frames of image:
determine the target encoding frame rate corresponding to the confidence value latest generated, based on the mapping relationship curve between confidence value and target encoding frame rate, and transmit the target encoding frame rate determined to the second processing unit; and
the second processing unit is to encode and record the N frames of image, based on the target encoding frame rate determined.

9. The device according to claim 6, wherein the second processing unit is further to determine an actual bit stream R and an expected bit stream S, every time when a predetermined condition is met, and transmit R and S to the first processing unit; and
the first processing unit is further to determine whether it is necessary to adjust the mapping relationship curve, based on R and S; when determining that it is necessary to adjust the mapping relationship curve based on R and S, the first processing unit is further to adjust the mapping relationship curve;
wherein the adjusting comprises:
increasing the target encoding frame rate corresponding to the confidence value between Tmin and Tmin, when S>R; and
decreasing the target encoding frame rate corresponding to the confidence value between Tmin and Tmin, when S<R.

10. The device according to claim 9, wherein R=consumed storage capacity/stored time, and S=un-consumed storage capacity/expected storage time.

* * * * *